United States Patent
Clarke

[15] 3,646,561
[45] Feb. 29, 1972

[54] ADHESIVELY SECURED AUTOMOBILE WINDSHIELD ANTENNA

[72] Inventor: Edwin B. Clarke, Dorchester Apts., 266 W. Rittenhouse Sq., Philadelphia, Pa. 19103

[22] Filed: Jan. 19, 1971

[21] Appl. No.: 107,683

[52] U.S. Cl. ............................343/711, 343/713, 343/873, 343/897, 343/906
[51] Int. Cl. .............................................H01q 1/32
[58] Field of Search...................343/711, 713, 873, 897, 906

[56] References Cited

UNITED STATES PATENTS 2,197,601  4/1940  Wolaver................................343/713
2,774,811  12/1956  Shanok et al. ..........................343/711
3,414,902  12/1968  Shaw, Jr. ................................343/713

FOREIGN PATENTS OR APPLICATIONS 1,237,187  6/1960  France....................................343/713

Primary Examiner—Herman Karl Saalbach
Assistant Examiner—Saxfield Chatmon, Jr.
Attorney—Stanley Bilker

[57] ABSTRACT

An automobile antenna which is adapted to be secured to be adhesively secured to the windshield in replacement of the fender aerial. The antenna is encapsulated within a pressure sensitive tape and permanently joined to the lead-in cable by a molded flexible coupling.

1 Claims, 5 Drawing Figures

PATENTED FEB 29 1972 3,646,561

INVENTOR
EDWIN B. CLARKE
BY
ATTORNEY

ADHESIVELY SECURED AUTOMOBILE WINDSHIELD ANTENNA

This invention relates to a radio antenna, and more particularly relates to an automobile antenna which is adapted to be adhesively secured to the inside of a car windshield by means of a transparent flexible tape in order to prevent pilferage and vandalism of the conventional automobile fender aerials.

In view of the widespread vandalism in regard to conventional aerials which have been mounted as telescoping tubes and rods on the fenders of automobiles, new car manufacturers have now turned to the mounting of the radio antenna within the windshield laminates, the window being selected because of its minimal shielding effect upon the radiofrequency waves. However, since the permanent type installation within the windshield itself is a relatively recent innovation, the problem has not been solved with respect to the estimated 50 million old model cars with conventional aerials in view of the expense of conversion.

The present invention comprises an antenna which is encapsulated within a transparent pressure-sensitive tape which can be adhesively secured directly to the inside surface of the windshield. Another feature of the instant invention is the manner in which the antenna is permanently joined to the lead-in cable to the radio itself by means of a molded flexible coupling. In this manner, the antenna can act as a complete replacement for the previously installed aerial system.

It is therefore an object of this invention to provide a radio antenna for an automobile which is adhesively secured to the inside of the windshield without affecting visibility and without diminishing radio wave reception.

Another object of this invention is to provide a hermetically sealed coupling for permanently connecting a flexible antenna lead to a radio lead-in cable.

Still other objects of this invention are to provide an improved device of the character described that is easily and economically produced, which is sturdy in construction, and which is both highly effective and efficient in operation.

With the above and related objects in view, this invention consists of the details of construction and combination of parts as will be more fully understood from the following detailed description when read in conjunction with the accompanying drawing in which.

Figure 1:
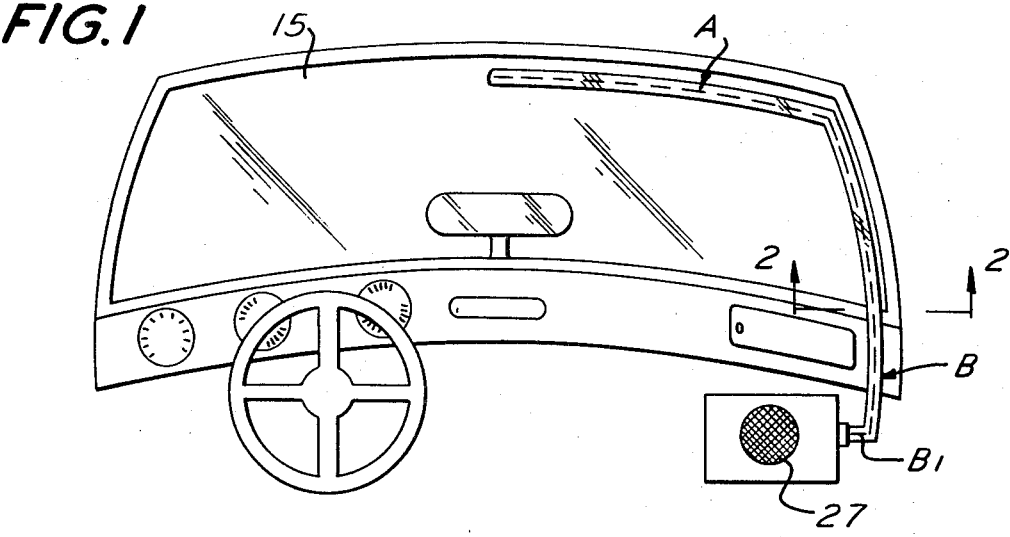
FIG. 1 is a perspective view showing the manner of attachment of an automobile radio antenna embodying the present invention to the windshield in replacement of the existing car fender aerial.
Figures 2, 3:
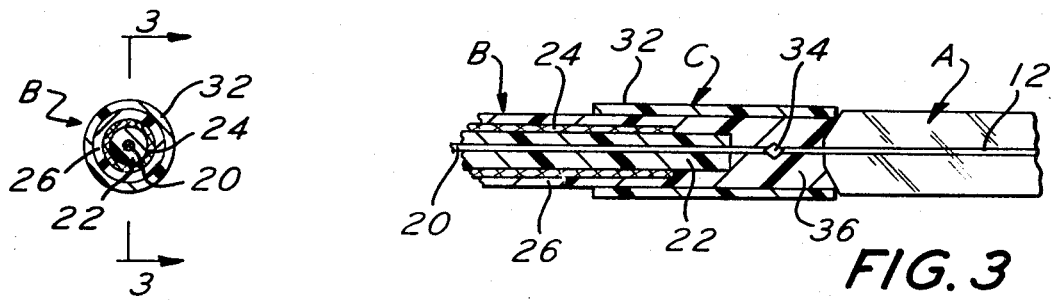
FIG. 2 is a sectional view taken along lines 2—2 of FIG. 1.
FIG. 3 is a sectional view taken along lines 3—3 of FIG. 2.
Figure 4:
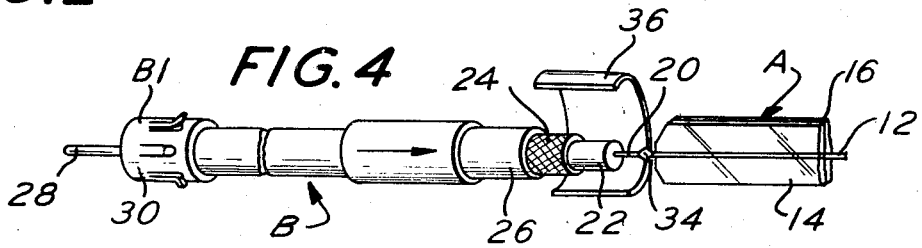
FIG. 4 is a perspective view and partly broken away to show the manner of fabricating the coupling of the antenna to the radio lead-in cable.
Figure 5:
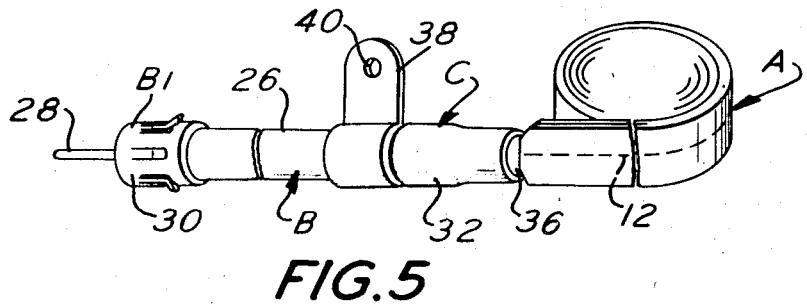
FIG. 5 is a perspective view showing the completed coupling.

Referring now in greater detail to the drawing in which similar reference characters refer to similar parts, there is shown a windshield antenna comprising an antenna portion, generally designated as A, a cable lead-in portion, generally designated as B, and a flexible coupling C for connecting the aerial portion to the cable.

The aerial portion A comprises a flexible conductor wire 12, preferably of 0.015 inch gauge copper or aluminum, which is encapsulated between two strips of transparent plastic tapes 14 and 16, for example, 0.020 polyvinyl acetate strips having a pressure-sensitive clear adhesive, such as cellulose acetate butyrate in a latex base, applied to the surface which is to be abutted against the windshield 15.

The cable B is generally conventional and includes a centrally disposed stranded wire conductor 20, about which is extruded a polyethylene sheath 22, a metallic shield 24 braided about the sheath 22, and a polyvinyl chloride jacket 26 formed about the braided shield. At one end there is a jack B1 which is adapted to be plugged into a standard complementary female fitting (not shown) in the radio housing 27. A pin 28 is electrically joined to the central conductor 20 while the casing 30 is electrically connected to the metal braid 24, both by usual soldering procedures, such as silver soldering.

In order to join the antenna portion A to the cable B, the free end of the latter is stripped back to expose the wire end 20 and the inner tube 22 in concentric steps. A polyvinyl chloride collar 32 is slipped over the free end of the cable jacket 26 and pushed back out of the way temporarily. The corners of the tapes 14 and 16 are cut back diagonally at one end to expose a short portion of the wire 12, the latter being soldered to the end of the conductor 20 to define a splice 34. A partially cured rubber latex tape 36 is then wound about the stripped back end of the sheath or tube 22 up to and including the cornered end of the tapes 14 and 16. A grounding strap 38 may be connected to the braided shield 24 and then to support the cable B by way of its eyelet 40. The collar 32 is next moved forwardly over the wound latex tape 36 and the entire joint compression molded with heat to die form a hermetic seal about the splice. The collar 32 may also be shrink fit about the tape 36.

The tape 36 will be cured within the molded cylinder 32 while the latter will be plastically welded to the jacket 26 to define a flexible joint fully enclosing the end of the tapes 14 and 16. The antenna portion A may be wound as a coil or roll prior to shipment so as to form a convenient package.

Although this invention has been described in considerable detail, such description is intended as being illustrative rather than limiting since the invention may be variously embodied, and the scope of the invention is to be determined as claimed.

What is claimed is:

1. A transparent radio antenna for adhesive attachment to an automobile windshield comprising an aerial portion including a metal wire and a pair of pressure-sensitive plastic tapes encapsulating said metal wire in a flexible longitudinally extending sandwich, a cable portion including a central wire conductor, a plastic sheath covering said wire conductor, a metallic shield braided about said plastic sheath, a plastic jacket concentrically disposed about said braided metallic shield, and a jack secured to one end of said cable portion and electrically connected to said wire conductor, said wire and said wire conductor being electrically connected at adjacent ends to define a splice, a polymeric tape wound about said splice, and a plastic collar cylindrically molded about said wound polymeric tape and having ends plastically welded to the respective plastic sheath and pressure-sensitive plastic tapes.

* * * * *